(12) United States Patent
Spence et al.

(10) Patent No.: US 10,450,049 B2
(45) Date of Patent: Oct. 22, 2019

(54) MODULAR ELECTRICAL SIGNAL SUPPLY ASSEMBLIES, VEHICLES, AND RELATED METHODS

(71) Applicant: The Boeing Company, Chicago, IL (US)

(72) Inventors: Andrew J. Spence, Seattle, WA (US); Yakentim M. Ibrahim, Brier, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/728,240

(22) Filed: Oct. 9, 2017

(65) Prior Publication Data
US 2019/0109422 A1    Apr. 11, 2019

(51) Int. Cl.
*B64C 1/18*    (2006.01)
*H01R 25/16*    (2006.01)
*B64D 11/00*    (2006.01)
*B64D 11/06*    (2006.01)

(52) U.S. Cl.
CPC ............... *B64C 1/18* (2013.01); *B64D 11/06* (2013.01)

(58) Field of Classification Search
USPC .............. 439/34, 110, 112; 244/118.6, 118.5
See application file for complete search history.

(56) References Cited

U.S. PATENT DOCUMENTS

| 7,063,562 | B2* | 6/2006 | Henley | B64C 1/18 439/34 |
| 8,033,501 | B2* | 10/2011 | Callahan | B64C 1/20 174/74 R |
| 2016/0193484 | A1* | 7/2016 | Riedel | A62B 7/14 128/202.13 |

OTHER PUBLICATIONS

U.S. Appl. No. 15/287,949, filed Oct. 7, 2016, Ibrahim et al.

* cited by examiner

*Primary Examiner* — Xuong M Chung Trans
(74) *Attorney, Agent, or Firm* — DASCENZO Intellectual Property Law, P.C.

(57) ABSTRACT

A modular electrical signal supply assembly includes at least one power/data strip (PDS) configured to provide an electrical signal to an electrical device and at least one mounting clip configured to couple each PDS to a sub-floor surface structure. A vehicle includes an interior cabin with an electrical signal distribution system that includes a plurality of modular electrical signal supply assemblies and a plurality of electrical devices. Each modular electrical signal supply assembly includes a PDS and a mounting clip. Each PDS is configured to provide an electrical signal to an electrical device and is electrically coupled to at least one other PDS. A method of assembling an interior cabin includes providing at least two modular electrical signal supply assemblies, each of which a PDS and a mounting clip, and electrically coupling each PDS to at least one other PDS.

20 Claims, 8 Drawing Sheets

MODULAR ELECTRICAL SIGNAL SUPPLY ASSEMBLIES, VEHICLES, AND RELATED METHODS

FIELD

The present disclosure relates to modular electrical signal supply assemblies.

BACKGROUND

Vehicles configured for passenger transport may include passenger seats with electrical devices incorporated into and/or otherwise associated with the passenger seats. For example, a passenger seat may include a video display screen, an electrical charging port, and/or another electrical device for the passenger's use. The passenger seats may be positioned in an interior cabin of the vehicle with a floor surface, and the electrical devices may receive electrical power and/or data via wiring positioned below the floor surface. Traditional wiring schemes may include running wires or wire bundles from an electrical signal source to each individual electrical device as the passenger seats are installed. Such a wiring scheme may impose a high engineering burden and/or factory install cost due to lengthy installation time as well as the necessity of designing the wiring scheme around a given passenger seat layout. Thus, for example, adjusting an existing passenger seat layout may necessitate a complete reinstallation of the wiring scheme.

SUMMARY

Modular electrical signal supply assemblies, vehicles and related methods are disclosed. A modular electrical signal supply assembly for an interior cabin of a vehicle includes at least one power/data strip (PDS) configured to provide an electrical signal to at least one electrical device positioned within the interior cabin and at least one mounting clip configured to couple each PDS to a sub-floor surface structure. The mounting clip is configured to selectively engage at least one corresponding mounting hole of the sub-floor surface structure and to maintain the PDS below a floor panel positioned in the interior cabin. The mounting clip includes a body portion configured to engage the sub-floor surface structure and a flange portion configured to engage the PDS. The body portion and the flange portion are statically coupled to one another in a predetermined orientation.

A vehicle includes an interior cabin and an electrical signal distribution system positioned within the interior cabin. The interior cabin includes at least one sub-floor surface structure configured to retain at least one passenger seat in position within the interior cabin and at least one aisle extending at least substantially parallel to a cabin longitudinal axis, such that the aisle is configured to permit a passenger to access a passenger seat. The electrical signal distribution system includes a plurality of modular electrical signal supply assemblies and a plurality of electrical devices. Each modular electrical signal supply assembly includes at least one power/data strip (PDS) and at least one mounting clip configured to couple each PDS to a sub-floor surface structure. Each PDS is configured to provide an electrical signal to at least one of the plurality of electrical devices. The mounting clip is configured to selectively engage at least one corresponding mounting hole of the sub-floor surface structure. Each PDS is selectively electrically coupled to at least one of an electrical signal source and at least one other PDS by a jumper configured to transmit the electrical signal.

A method of assembling an interior cabin of a vehicle includes providing at least two modular electrical signal supply assemblies, each modular electrical signal supply assembly including at least one power/data strip (PDS) configured to provide an electrical signal to at least one electrical device positioned within the interior cabin and at least one mounting clip configured to couple each PDS to a sub-floor surface structure. The mounting clip is configured to maintain the PDS below a floor panel positioned in the interior cabin. The method further includes electrically coupling each PDS to at least one of an electrical signal source and at least one other PDS to form a signal supply chain configured to transit the electrical signal between the PDSs.

DESCRIPTION

FIGS. 1-13 provide illustrative, non-exclusive examples of modular electrical signal supply assemblies 100, of electrical signal distribution systems 200 including modular electrical signal supply assemblies 100, and/or of vehicles 10 including modular electrical signal supply assemblies 100 and/or electrical signal distribution systems 200, according to the present disclosure. Elements that serve a similar, or at least substantially similar, purpose are labeled with like numbers in each of FIGS. 1-13, and these elements may not be discussed in detail herein with reference to each of FIGS. 1-13. Similarly, all elements may not be labeled in each of FIGS. 1-13, but reference numerals associated therewith may be utilized herein for consistency. Elements, components, and/or features that are discussed herein with reference to one or more of FIGS. 1-13 may be included in and/or utilized with any of FIGS. 1-13 without departing from the scope of the present disclosure. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
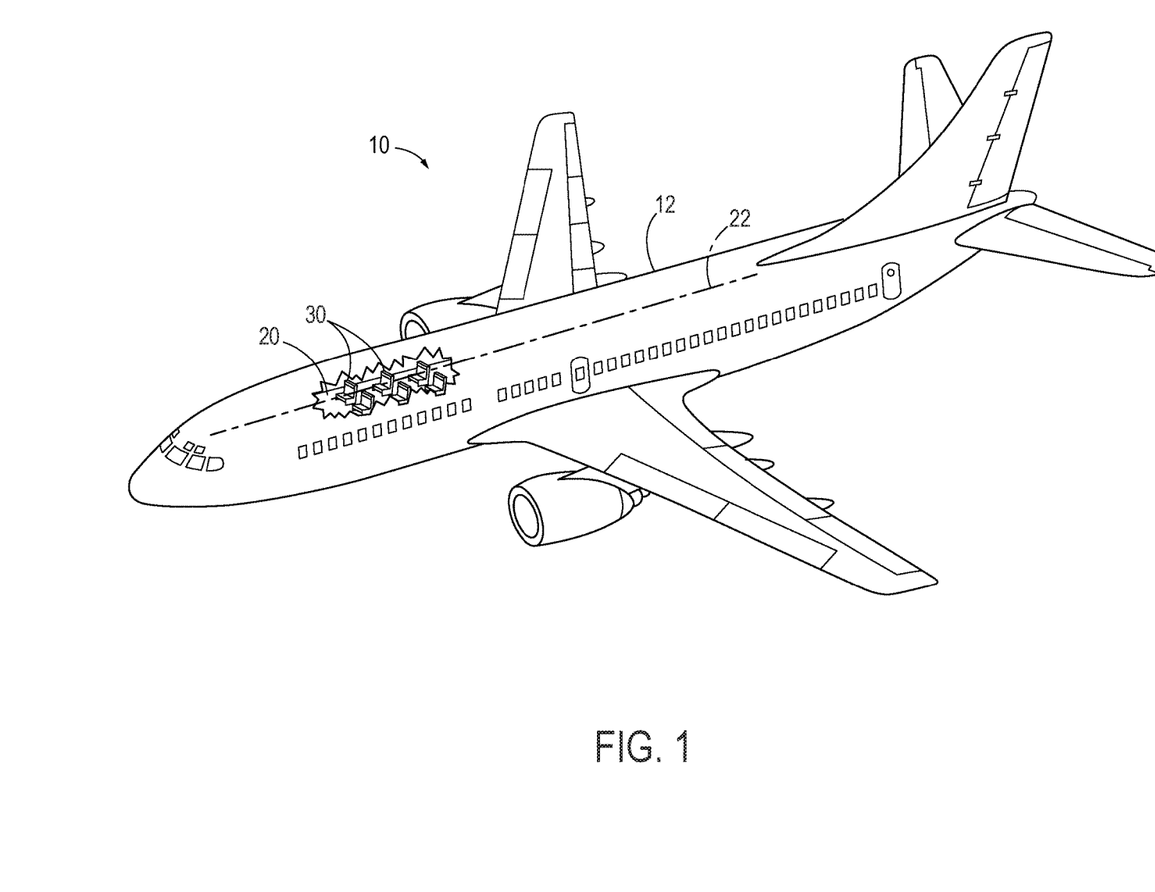
FIG. 1 is a perspective view of an example aircraft.

FIG. 1 is an illustration of an example vehicle 10 that includes modular electrical signal supply assemblies 100 according to the present disclosure. The vehicle 10 generally may be utilized to transport persons and/or cargo. As illustrated in FIG. 1, the vehicle 10 may be an aircraft with a fuselage 12 that encloses an interior cabin 20. The interior cabin 20 may contain a plurality of passenger seats 30 distributed about a cabin longitudinal axis 22.

Figures 2, 3, 4:
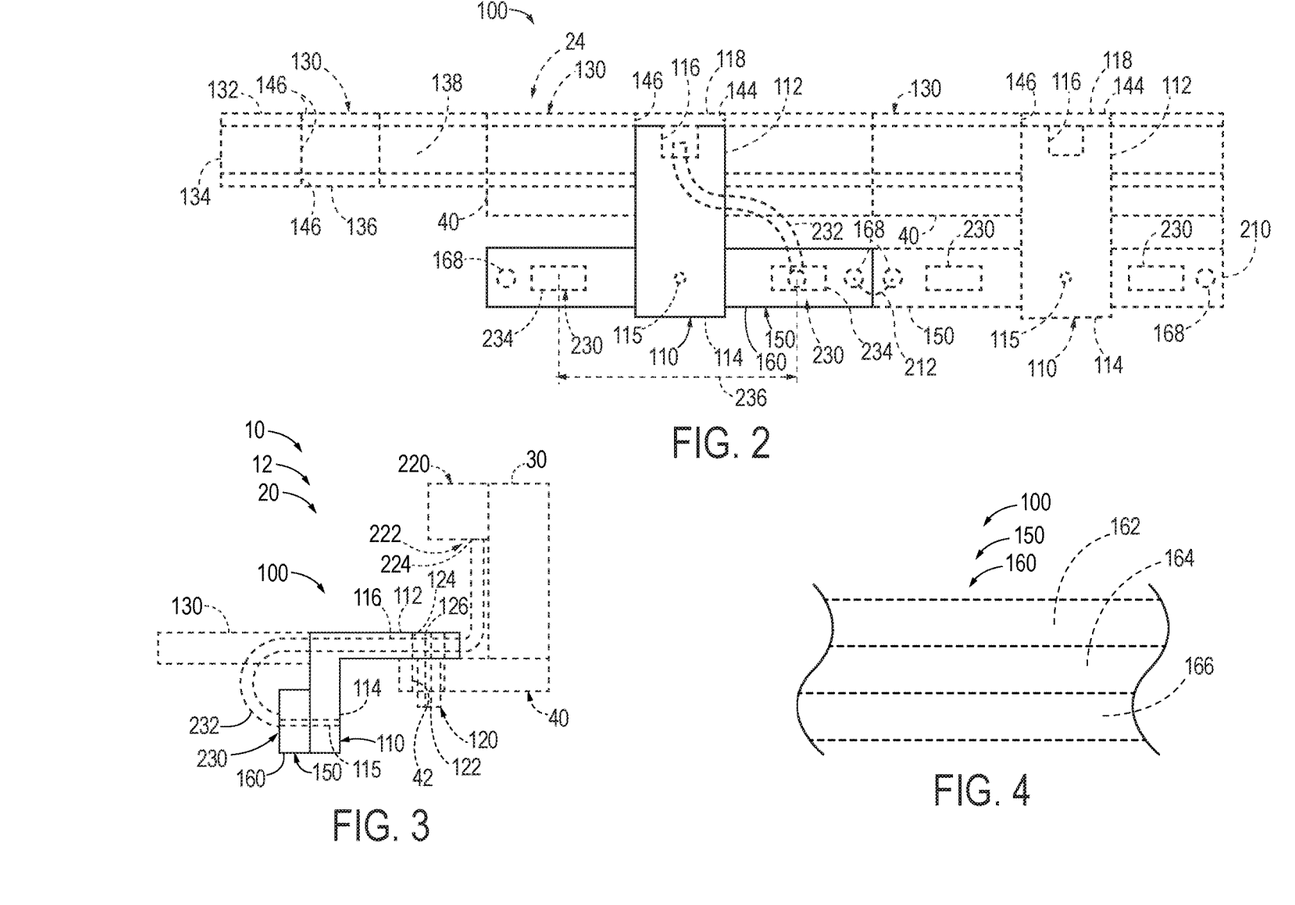
FIG. 2 is a schematic front elevation view representing modular electrical signal supply assemblies according to the present disclosure.
FIG. 3 is a schematic side elevation view representing modular electrical signal supply assemblies according to the present disclosure.
FIG. 4 is a schematic elevation view representing printed circuit boards according to the present disclosure.

FIGS. 2-5 are schematic views of illustrative, non-exclusive examples of modular electrical signal supply assemblies 100, which may be positioned in and/or form a portion of the interior cabin 20, and/or of electrical signal distribution systems 200 including the modular electrical signal supply assemblies 100. As schematically illustrated in FIGS. 2-3, a modular electrical signal supply assembly 100 includes at least one power/data strip (PDS) 150 configured to provide an electrical signal to at least one electrical device 220 positioned within the interior cabin 20 (not illustrated in FIG. 2) and at least one mounting clip 110 configured to couple each PDS 150 to a sub-floor surface structure 40. As used herein, the mounting clip 110 also may be referred to as a mount, a spacer, a hanger, and/or a bracket. The mounting clip 110 is configured to selectively engage at least one sub-floor surface structure mounting hole 42 of the sub-floor surface structure 40 to retain the mounting clip 110, and hence, the PDS 150, in position with respect to the sub-floor surface structure 40. More specifically, and as schematically illustrated in FIGS. 2-3, the mounting clip 110 is configured to maintain the PDS 150 below a floor panel 130 positioned in the interior cabin 20.

Figure 5:
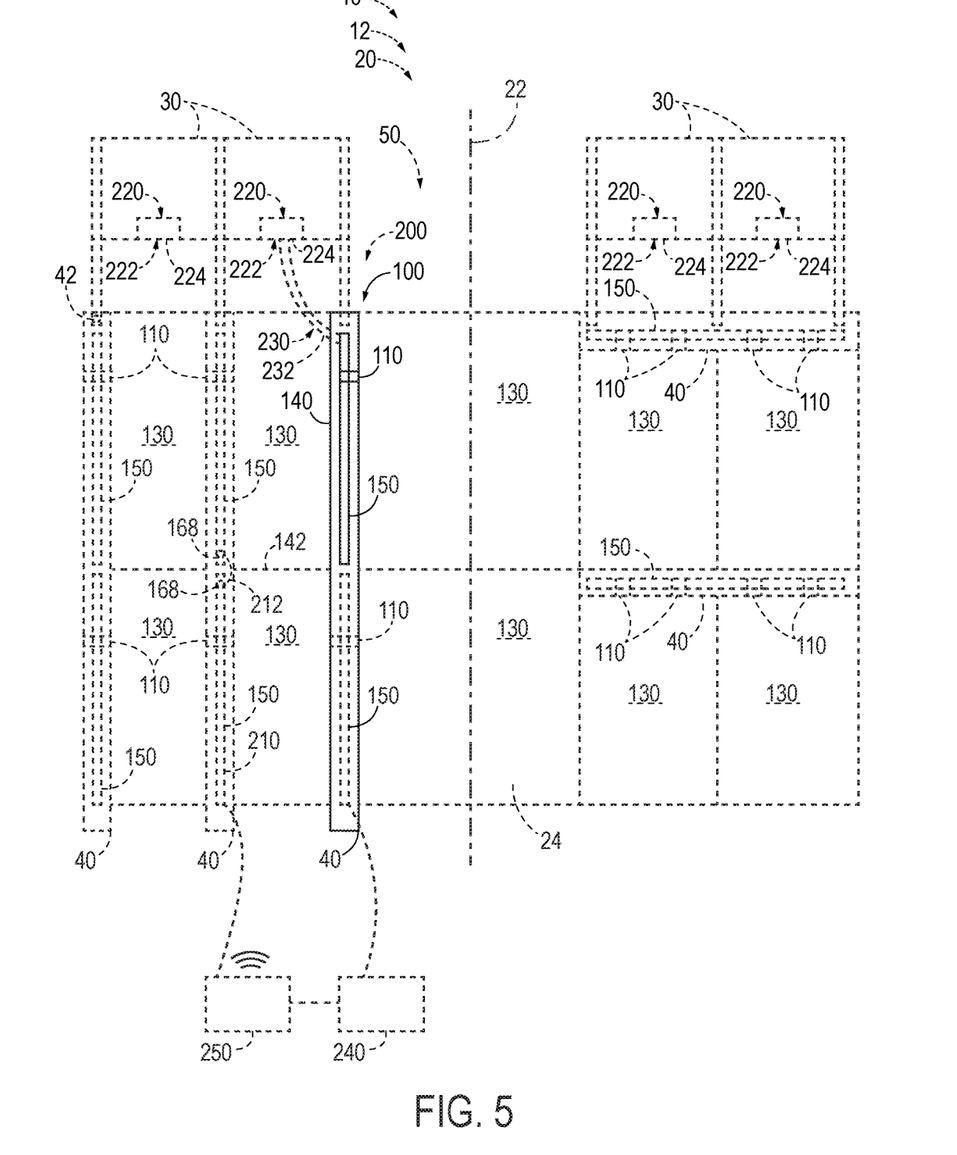
FIG. 5 is a schematic plan view representing an interior cabin of a vehicle including modular electrical signal supply assemblies according to the present disclosure.

As schematically illustrated in FIG. 2, the floor panel 130 may be configured to be coupled to the sub-floor surface structure 40 within the interior cabin to at least partially define a floor surface 24. As schematically illustrated in FIG. 5, the floor surface 24 may define at least one aisle 50 extending at least substantially parallel to the cabin longitudinal axis 22 and configured to permit a passenger to access a passenger seat 30. The sub-floor surface structure 40 may include and/or be any appropriate structure for supporting the floor panel 130, such as a structure configured to retain at least one passenger seat 30 within the interior cabin 20. In such an embodiment, the sub-floor surface structure 40 may include and/or be a seat track.

As used herein, positional terms such as "upper," "lower," "above," "below," "underneath," and the like may be used to describe spatial relationships between components of modular electrical signal supply assemblies 100, of electrical signal distribution systems 200, and/or of vehicles 10 in an illustrative, non-limiting manner, and generally refer to a configuration in which the floor panel 130 extends at least substantially horizontally within the interior cabin 20. For example, a passenger seat 30 may be described as being positioned above a floor panel 130 when the passenger seat 30 and the floor panel 130 are installed within the interior cabin 20. Such terms are provided as context only and do not limit component parts of modular electrical signal supply assemblies 100, of electrical signal distribution systems 200, and/or of vehicles 10 to always be in a specific orientation relative to ground.

As schematically illustrated in FIGS. 2-3, the mounting clip 110 may be described as including a body portion 112 configured to engage the sub-floor surface structure 40 and a flange portion 114 configured to engage the PDS 150. The body portion 112 and the flange portion 114 may be statically coupled to one another in a predetermined orientation. For example, the body portion 112 may extend at least substantially parallel to the floor panel 130, and/or the flange portion 114 may extend at least substantially perpendicular to the floor panel 130, when the mounting clip 110 engages the sub-floor surface structure 40 and when the floor panel 130 is positioned in the interior cabin 20. The body portion 112 and the flange portion 114 may refer to respective sections and/or regions of a monolithic mounting clip 110, or may refer to components that are coupled to one another to form the mounting clip 110.

The body portion 112 of the mounting clip 110 may be configured to engage the sub-floor surface structure 40 in any appropriate manner. For example, and as schematically illustrated in FIG. 2, the sub-floor surface structure 40 may include at least one sub-floor surface structure mounting hole 42 positioned along a length of the sub-floor surface structure 40, and the mounting clip 110 may include at least one surface structure fastener 120 configured to engage a corresponding sub-floor surface structure mounting hole 42 to couple the mounting clip 110 to the sub-floor surface structure 40. As a more specific example, the surface structure fastener 120 may include a protrusion 122 that extends from the body portion 112 and through a corresponding sub-floor surface structure mounting hole 42. Additionally or alternatively, the body portion 112 may include a fastener aperture 124, and the surface structure fastener 120 may include a mechanical fastener 126 configured to extend through the fastener aperture 124 and through the sub-floor surface structure mounting hole 42 to couple the mounting clip 110 to the sub-floor surface structure 40. A given sub-floor surface structure mounting hole 42 may be specifically configured to receive the surface structure fastener 120 of the mounting clip 110, or may additionally be configured for mounting a separate object to the sub-floor surface structure 40, such as a passenger seat 30 and/or a floor panel 130. Stated differently, the sub-floor surface structure 40 may include one or more sub-floor surface structure mounting holes 42 that each are configured for mounting one or more of a mounting clip 110, a passenger seat 30, and/or a floor panel 130. As a more specific example, and as schematically illustrated in FIG. 2, the floor panel 130 may include a plurality of floor panel mounting holes 144 configured to align with a corresponding plurality of sub-floor surface structure mounting holes 42 for coupling the floor panel 130 to the sub-floor surface structure 40.

The flange portion 114 of the mounting clip 110 may be configured to engage the PDS 150 in any appropriate manner. As examples, the flange portion 114 may be configured to be adhered to the PDS 150 by an adhesive, and/or may be configured to be coupled to the PDS 150 by a mechanical fastener. For example, and as schematically illustrated in FIGS. 2-3, the mounting clip 110 may include a flange fastener 115 configured to mechanically couple the flange portion 114 to the PDS 150. The flange fastener 115 may include and/or be any appropriate mechanical fastener, examples of which include a screw, a bolt, a tack, a barb, and/or a rivet. Additionally or alternatively, the flange portion 114 may be configured to be coupled to the PDS 150 in a snap-fit and/or friction-fit coupling, and/or may be configured to at least partially circumferentially enclose the PDS 150 when the flange portion 114 engages the PDS 150. In some examples, the flange portion 114 may be configured to be selectively and repeatedly coupled to the PDS 150 and uncoupled from the PDS 150 without damaging the mounting clip 110 or the PDS 150. In other examples, the flange portion 114 may be coupled to the PDS 150 in such a manner that the flange portion 114 is not configured to be removed from the PDS 150 without damaging the mounting clip 110 and/or the PDS 150.

The PDS 150 may be configured to provide the electrical signal to the electrical device 220 in any appropriate manner. For example, and as schematically illustrated in FIGS. 2-3 and 5, the modular electrical signal supply assembly 100 may include an outlet 230 configured to electrically couple the PDS 150 to the electrical device 220. As schematically illustrated in FIG. 2, the outlet 230 may include an outlet connector interface 234 configured to be selectively electrically coupled to the electrical device 220 (not illustrated in FIG. 2), such as via an input 222 and/or an input connector interface 224 of the electrical device 220 (schematically illustrated in FIGS. 3 and 5). As used herein, the terms "electrically connected" and/or "electrically coupled" may refer to two or more electronic devices and/or components that are coupled by an electrically conductive medium such that an electric signal may propagate between the electronic devices in a controlled and/or predictable manner. As used herein, the terms "selectively electrically connected" and/or "selectively electrically coupled" may refer to an electrical connection that may be selectively and repeatedly formed and broken without damaging the electrical devices and/or the connectors that form the electrical connection.

The outlet connector interface 234 may include and/or be any appropriate structure for conveying the electrical signal between the PDS 150 and the electrical device 220. As examples, the outlet connector interface 234 may include and/or be a plug, a male plug, a female plug, a receptacle, a coaxial connector, a pin header, a header connector, an edge connector, an Ethernet connector, and/or a USB connector. As schematically illustrated in FIG. 2, the outlet connector interface 234 may be statically fixed to the PDS 150 and/or may be incorporated into the PDS 150. Alternatively, the outlet 230 may include an outlet cord 232 extending from the PDS 150, and the outlet connector interface 234 may be positioned on the outlet cord 232. The outlet cord 232 may be hard-wired to the PDS 150 and/or may be fixedly coupled to the PDS 150. Stated differently, the outlet cord 232 may not be configured to be removed from the PDS 150 without damaging the outlet cord 232 and/or the PDS 150. Alternatively, the outlet cord 232 may be configured to be selectively electrically coupled to the PDS 150, such as via an outlet connector interface 234 that is statically fixed to and/or incorporated into the PDS 150. In such an embodiment, the outlet 230 may include a first outlet connector interface 234 that is statically fixed to and/or incorporated into the PDS 150, the outlet cord 232 selectively coupled to the first outlet connector interface 234, and a second outlet connector interface 234 positioned on the outlet cord 232 distal the first outlet connector interface 234.

The input connector interface 224 of the electrical device 220 may include and/or be any appropriate structure for selectively electrically coupling the electrical device 220 to the outlet 230 of the modular electrical signal supply assembly 100. As examples, the input connector interface 224 may include a plug, a male plug, a female plug, a receptacle, a coaxial connector, a pin header, a header connector, an edge connector, an Ethernet connector, and/or a USB connector. The input connector interface 224 may be configured to be electrically coupled to the outlet connector interface 234, such as via the outlet cord 232 extending between and electrically coupled to each of the input connector interface 224 and the outlet connector interface 234. Additionally or alternatively, the input 222 of the electrical device 220 may include an input cord that extends from the electrical device 220 and that includes the input connector interface 224.

The modular electrical signal supply assembly 100 may include any appropriate number of outlets 230, which may be positioned on the PDS 150 in any appropriate manner. For example, and as schematically illustrated in FIG. 2, the modular electrical signal supply assembly 100 may include a plurality of outlets 230 distributed along the PDS insert and separated by an outlet spacing 236. As more specific examples, the modular electrical signal supply assembly 100 may include at least two outlets 230, at least three outlets 230, at least four outlets 230, at least five outlets 230, at least 10 outlets 230, and/or at least 20 outlets 230. The outlet spacing 236 may be any appropriate distance, such as a distance that is selected to correspond to a seat pitch of the plurality of passenger seats 30. As more specific examples, the outlet spacing 236 may be at least 20 centimeters (cm), at least 40 cm, at least 60 cm, at least 80 cm, at least 100 cm, at least 120 cm, at most 130 cm, at most 110 cm, at most 90 cm, at most 70 cm, at most 50 cm, at most 30 cm, 30-50 cm, 40-60 cm, 50-70 cm, 60-80 cm, 70-90 cm, 80-100 cm, and/or 90-110 cm.

The mounting clip 110 may include one or more components and/or features configured to receive and/or engage a component of the outlet 230. As an example, and as schematically illustrated in FIGS. 2-3, the body portion 112 of the mounting clip 110 may include a cord channel 116 configured to at least partially circumferentially enclose an outlet cord 232 extending from the PDS 150. The cord channel 116 may serve to support, protect, and/or guide the outlet cord 232, such as to direct the outlet cord 232 from the PDS 150 toward and/or to the electrical device 220. The cord channel 116 may have a width that is at least equal to, substantially equal to, and/or greater than a width of the outlet cord 232. Additionally or alternatively, the cord channel 116 may be configured to at least partially circumferentially enclose each of a plurality of outlet cords 232, such as may be associated with a corresponding plurality of outlets 232 of one or more PDSs 150.

In some embodiments, the cord channel 116 and/or the mounting clip 110 may be configured to fully circumferentially enclose the outlet cord 232. As an example, the cord channel 116 may be a shrouded cord channel that fully circumferentially encloses the outlet cord 232. Stated differently, the cord channel 116 may refer to an enclosed hole and/or passage defined by the body portion 112, such that the outlet cord 232 is received in the cord channel 116 by threading the outlet cord 232 through the cord channel 116 from a terminal end of the outlet cord 232.

As another example, and as schematically illustrated in FIG. 2, the cord channel 116 may be configured to partially circumferentially enclose the outlet cord 232, and the mounting clip 110 further may include a channel cover 118 configured to be selectively installed on the cord channel 116 to fully circumferentially enclose the outlet cord 232. That is, in such an embodiment, when the outlet cord 232 is received within the cord channel 116 and the channel cover 118 is installed on the cord channel 116, the cord channel 116 and the channel cover 118 collectively serve to fully circumferentially enclose the outlet cord 232. The channel cover 118 may be configured to engage the body portion 112 and/or the cord channel 116 directly, and/or may be configured to engage a separate component, such as the floor panel 130. For example, and as schematically illustrated in FIG. 2, the floor panel 130 may include a mounting clip cutout 146 configured to receive and/or engage at least a portion of the mounting clip 110, such as the body portion 112, the cord channel 116, and/or the channel cover 118. Stated differently, the mounting clip 110, the body portion 112, the cord channel 116, and/or the channel cover 118 may be configured to be received within the mounting clip cutout 146. The mounting clip cutout 146 may be defined by any appropriate portion of the floor panel 130. For example, and as schematically illustrated in FIG. 2, the floor panel 130 may include an upper face sheet 132, a lower face sheet 136, and/or a core layer 134 positioned between the upper face sheet 132 and the lower face sheet 136, and the mounting clip cutout 146 may be defined by one or more of the upper face sheet 132, the core layer 134, and/or the lower face sheet 136. As a more specific example, the mounting clip cutout 146 may be configured such that the body portion 112 of the mounting clip 110 is at least substantially received within the core layer 134, and/or such that the channel cover 118 is at least substantially received within the upper face sheet 132, when the mounting clip 110 is received within the mounting clip cutout 146. Additionally or alternatively, the mounting clip cutout 146 may be configured such that, when the channel cover 118 is selectively installed on the cord channel 116 and the channel cover 118 is received in the mounting clip cutout 146, the channel cover 118 is at least substantially flush with an adjacent region of the floor panel 130. Such a configuration may serve to hide and/or otherwise minimize an appearance of the mounting clip cutout 146 and/or the channel cover 118.

The PDS 150 may include any appropriate structure for conveying and/or delivering the electric signal. For example, and as schematically illustrated in FIGS. 2-3, the PDS 150 may include a printed circuit board (PCB) 160, which may be a multi-layered PCB 160. For example, and as schematically illustrated in FIG. 4, the PCB 160 may include at least one power layer 162 configured to transmit electrical power, at least one data layer 164 configured to transmit a data signal, and/or at least one ground layer 166 configured to provide an electrical ground. While FIG. 4 schematically illustrates the PCB 160 as including one power layer 162, one data layer 164, and one ground layer 166, this is not required, and it is additionally within the scope of the present disclosure that the PCB 160 may include any number of power layers 162, data layers 164, and/or ground layers 166, and/or may not include a power layer 162, may not include a data layer 164, and/or may not include a ground layer 166. The power layer 162, the data layer 164, and the ground layer 166, when present, may be arranged in any appropriate configuration. For example, the ground layer 166 may be configured to provide electrical shielding to at least one power layer 162 and/or at least one data layer 164. As a more specific example, the ground layer 166 may be positioned between the power layer 162 and the data layer 164, such that the power layer 162 and the data layer 164 are separated by the ground layer 166. Additionally or alternatively, the PCB 160 may be a potted PCB that is at least partially encased in a resin, a thermosetting plastic, a polymer, polyurethane, silicone, and/or rubber.

FIG. 5 provides a schematic plan view of an interior cabin 20 that includes at least one modular electrical signal supply assembly 100. As discussed, the PDS 150 of the modular electrical signal supply assembly 100 is configured to provide an electrical signal to at least one electrical device 220 positioned within the interior cabin 20. As used herein, an electrical signal distribution system 200 may generally refer to the combination of at least one modular electrical signal supply assembly 100 and at least one electrical device 220 electrically coupled to at least one PDS 150 of the modular electrical signal supply assembly 100. The electrical device 220 may be associated with, mounted to, and/or incorporated into a passenger seat 30. However, this is not required, and it is additionally within the scope of the present disclosure that the electrical device 220 may not be associated with a passenger seat 30, and/or may be associated with any appropriate equipment positioned within the interior cabin 20. As examples, the electrical device 220 may include and/or be a lighting assembly, a display, a video monitor, a sensor, an electrical power supply, a charging port, a USB charging port, a data port, a USB data port, an Ethernet port, and/or a wireless communication source. The electrical signal provided to the electrical device 220 by the PDS 150 may include and/or be an electrical power signal, a data signal, and/or an electrical ground.

As schematically illustrated in FIG. 5, the interior cabin 20 and/or the electrical signal distribution system 200 may include a plurality of modular electrical signal supply assemblies 100 with a corresponding plurality of PDSs 150. The interior cabin 20 may be configured such that each PDS 150 is at least substantially concealed from view when installed within the interior cabin 20. The electrical signal distribution system 200 further may include a plurality of electrical devices 220, such as may be installed on, incorporated into, and/or otherwise associated with a plurality of passenger seats 30 and/or other equipment positioned within the interior cabin 20. An electrical device 220 may be electrically coupled to a respective single PDS 150 of the plurality of PDSs 150, and may be electrically coupled to a single outlet 230 of the corresponding modular electrical signal supply assembly 100 or to each of a plurality of outlets 230 of the corresponding modular electrical signal supply assembly 100. Alternatively, a single electrical device 220 may be electrically connected to each of a plurality of PDSs 150. Additionally or alternatively, a single PDS 150 may be electrically coupled to a respective single electrical device 220, or may be electrically coupled to each of a plurality of electrical devices 220, such as via a respective plurality of outlets 230 of the modular electrical signal supply assembly 100.

Each of the plurality of PDSs 150 may be electrically coupled to one another to form a signal supply chain 210 configured to transmit the electrical signal between the plurality of PDSs 150. For example, and as schematically illustrated in FIGS. 2 and 5, each PDS 150 may include a jumper terminal 168, and the electrical signal distribution system 200 may include at least one jumper 212 configured to be selectively electrically coupled to the jumper terminals 168 of each of at least two PDSs 150 to at least partially form the signal supply chain 210. Stated differently, the electrical signal distribution system 200 may include a first modular electrical signal supply assembly 100 with a first floor panel 130 and a first PDS 150 with a first jumper terminal 168, and further may include a second modular electrical signal supply assembly 100 with a second floor panel 130 and a second PDS 150 with a second jumper terminal 168, and the jumper 212 may be configured to be selectively electrically coupled to each of the first jumper terminal 168 and the second jumper terminal 168 to transmit the electrical signal between the first PDS 150 and the second PDS 150. In such a configuration, the first PDS 150 and the second PDS 150 may be described as at least partially defining the signal supply chain 210. In this manner, the plurality of modular electrical signal supply assemblies 100 may facilitate the formation of an electrical signal distribution system 200 and/or a signal supply chain 210 that may readily be customized and/or optimized for a given distribution of electrical devices 220 and/or passenger seats 30 within the interior cabin 20. For example, because each modular electrical signal supply assembly 100 may be selectively and individually chosen, configured, oriented, positioned, replaced, and/or serviced, an interior cabin 20 that includes an electrical signal distribution system 200 according to the present disclosure may be assembled, disassembled, serviced, and/or maintained more readily relative to a distribution system that relies on point-to-point wiring.

As schematically illustrated in FIG. 5, the electrical signal distribution system 200 may include a plurality of modular electrical signal supply assemblies 100 that are positioned such that the plurality of PDSs 150 are at least substantially collinear. In such an embodiment, the plurality of PDSs 150 that are at least substantially collinear may include each PDS 150 in the electrical signal distribution system 200, or may include a subset of the PDSs 150 in the electrical signal distribution system 200. As an example, the plurality of modular electrical signal supply assemblies 100 may be positioned such that the plurality of PDSs 150 are parallel, or at least substantially parallel, to the cabin longitudinal axis 22. As a more specific example, and as illustrated in the left-hand side of FIG. 5, a plurality of sub-floor surface structures 40 may extend parallel, or at least substantially parallel, to the cabin longitudinal axis 22, and a plurality of PDSs 150 may be mounted to the plurality of sub-floor surface structures 40 such that the plurality of PDSs 150 also extend parallel, or at least substantially parallel, to the cabin longitudinal axis 22. However, this is not required, and it is additionally within the scope of the present disclosure that the electrical signal distribution system 200 includes a plurality of PDSs 150 that extend perpendicular, or at least substantially perpendicular, to the cabin longitudinal axis 22. As an example, and as illustrated in dashed lines in the right-hand side of FIG. 5, one or more sub-floor surface structures 40 may extend perpendicular, or at least substantially perpendicular, to the cabin longitudinal axis 22, and one or more modular electrical signal supply assemblies 100 may be positioned on the one or more sub-floor surface structures 40 such that the plurality of PDSs 150 are perpendicular, or at least substantially perpendicular, to the cabin longitudinal axis 22.

As schematically illustrated in FIG. 5, the electrical signal distribution system 200 further may include an electrical signal source 240 configured to provide the electrical signal to the signal supply chain 210 and/or to at least one PDS 150 of the electrical signal distribution system 200. The electrical signal source 240 may be electrically coupled to the PDS 150 in any appropriate manner, such as via the jumper terminal 168 of the PDS 150. Additionally or alternatively, the electrical signal distribution system 200 may include a master control unit 250 in electrical communication with the at least one electrical device 220 and configured to control the electrical signal that is provided to each electrical device 220 by the electrical signal distribution system 200. The master control unit 250 may electrically communicate with the at least one electrical device 220 in any appropriate manner, such as via the electrical signal source 240, via the signal supply chain 210, and/or via a wireless signal.

The electrical signal that the PDS 150 provides to the electrical device 220 may have any appropriate electrical characteristics. For example, the electrical signal may include and/or be an electrical power signal with any appropriate current and/or voltage, such as a current and/or voltage sufficient to provide electrical power to a lighting assembly, a video display, an audio source, a charging port, and/or a USB charging port. As examples, the electrical signal may include an electrical current that is at least 100 milliamps (mA), at least 300 mA, at least 500 mA, at least 1 ampere (A), at least 3 A, at least 5 A, at most 10 A, at most 7 A, at most 2 A, at most 1 A, at most 700 mA, and/or at most 200 mA, and/or may include and/or be an alternating current and/or a direct current. Additionally or alternatively, the electrical power signal may include an electrical voltage that is at least 100 millivolts (mV), at least 500 mV, at least 1 volt (V), at least 5 V, at least 10 V, at least 50 V, at least 100 V, at least 500 V, at most 700 V, at most 200 V, at most 70 V, at most 20 V, at most 7 V, at most 2 V, at most 700 mV, and/or at most 200 mV. Additionally or alternatively, the electrical signal may include and/or be a data signal with any appropriate bandwidth, such as a bandwidth sufficient to provide data, services, information, a video signal, an audio signal, and/or an Internet connection to the electrical device 220. As examples, the data signal may have a bandwidth that is at least 10 kilobits per second (kbps), at least 100 kbps, at least 1 megabit per second (Mbps), at least 10 Mbps, at least 100 Mbps, at least 1 gigabit per second (Gbps), at least 10 Gbps, at most 50 Gbps, at most 5 Gbps, at most 500 Mbps, at most 50 Mbps, at most 5 Mbps, at most 500 kbps, and/or at most 50 kbps.

Turning now to FIGS. 6-13, illustrative non-exclusive examples of modular electrical signal supply assemblies 100 and electrical signal distribution systems 200 are illustrated. Where appropriate, the reference numerals from the schematic illustrations of FIGS. 1-5 are used to designate corresponding parts of the examples of FIGS. 6-13; however, the examples of FIGS. 6-13 are non-exclusive and do not limit the modular electrical signal supply assemblies 100 and/or the electrical signal distribution systems 200 to the illustrated embodiments of FIGS. 6-13. That is, the modular electrical signal supply assemblies 100 and/or the electrical signal distribution systems 200 are not limited to the specific embodiments of FIGS. 6-13, and the modular electrical signal supply assemblies 100 and/or the electrical signal distribution systems 200 may incorporate any number of the various aspects, configurations, characteristics, properties, etc. of the modular electrical signal supply assemblies 100 and/or the electrical signal distribution systems 200 that are illustrated in and discussed with reference to the schematic representations of FIGS. 1-5 and/or the embodiments of FIGS. 6-13, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 6-13; however, it is within the scope of the present disclosure that the previously discussed features, variants, etc. may be utilized with the examples of FIGS. 6-13.

Figure 6:
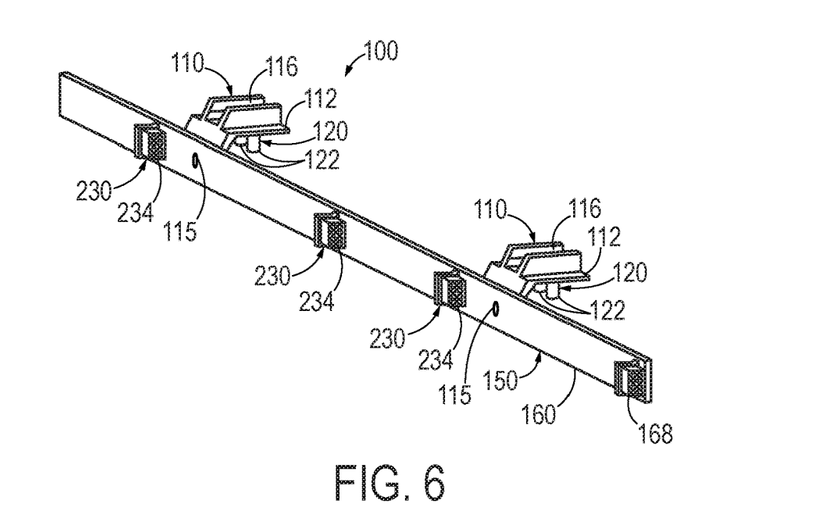
FIG. 6 is a front perspective view representing a modular electrical signal supply assembly according to the present disclosure.
Figure 7:
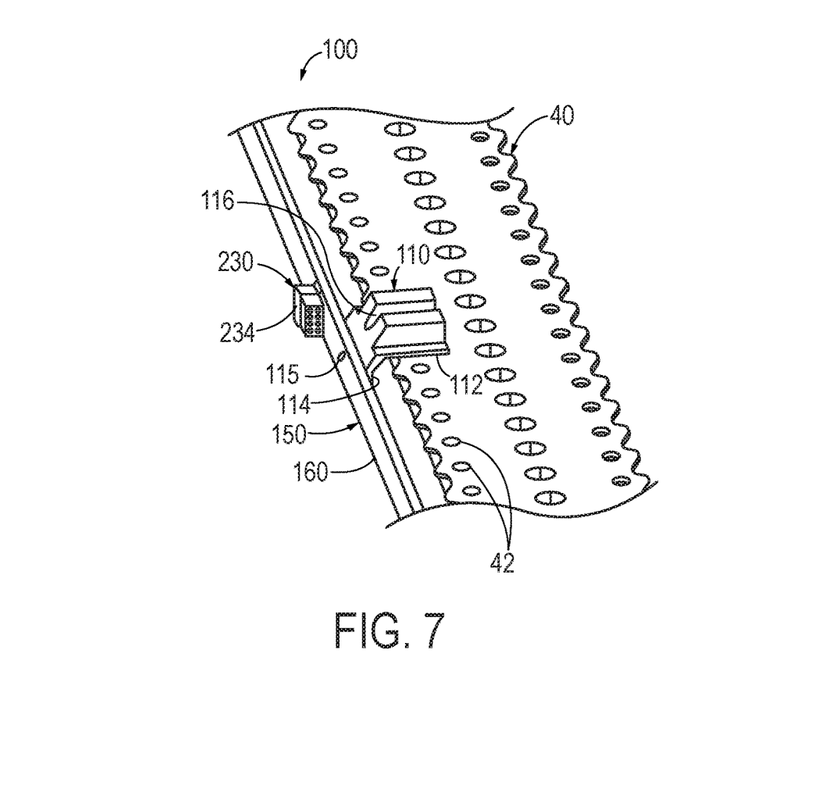
FIG. 7 is a front perspective view representing a modular electrical signal supply assembly mounted on a sub-floor surface structure according to the present disclosure.

FIG. 6 illustrates an example of a modular electrical signal supply structure 100 that includes a plurality of outlets 230 in the form of outlet connector interfaces 234 as well as a jumper terminal 168. The outlet connector interfaces 234 and the jumper terminal 168 are statically mounted to a PDS 150 that is coupled to a pair of mounting clips 110. Each mounting clip 110 includes a pair of surface structure fasteners 120 in the form of protrusions 122, as well as a cord channel 116 configured to partially circumferentially enclose an outlet cord 232 coupled to the outlet controller interface 234. FIG. 7 illustrates the modular electrical signal supply structure of FIG. 6 mounted to a sub-floor surface structure 40. Specifically, FIG. 7 illustrates the mounting clip 110 installed on the sub-floor surface structure 40 such that the two protrusions 122 are received in respective sub-floor surface structure mounting holes 42.

Figure 8:
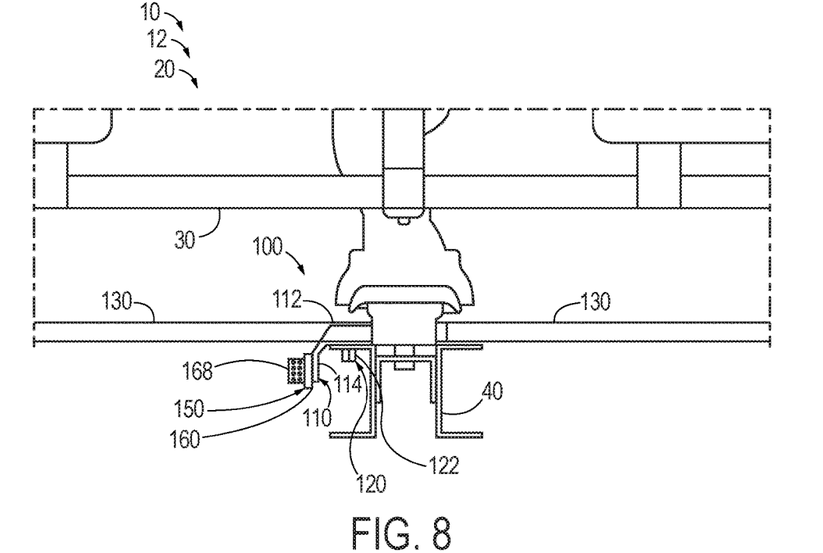
FIG. 8 is a side elevation view representing a modular electrical signal supply assembly positioned in an interior cabin of a vehicle according to the present disclosure.
Figure 9:
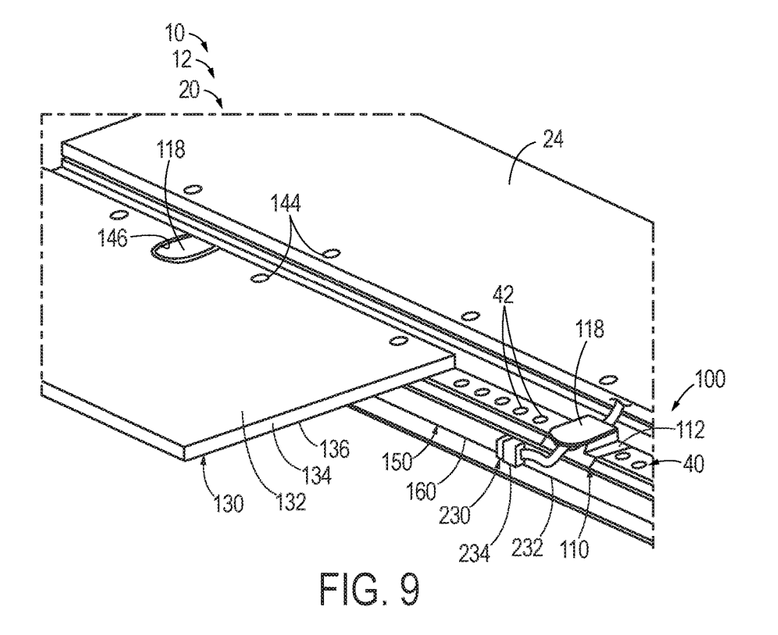
FIG. 9 is a front perspective view representing a modular electrical signal supply assembly positioned in an interior cabin of a vehicle according to the present disclosure.
Figure 10:
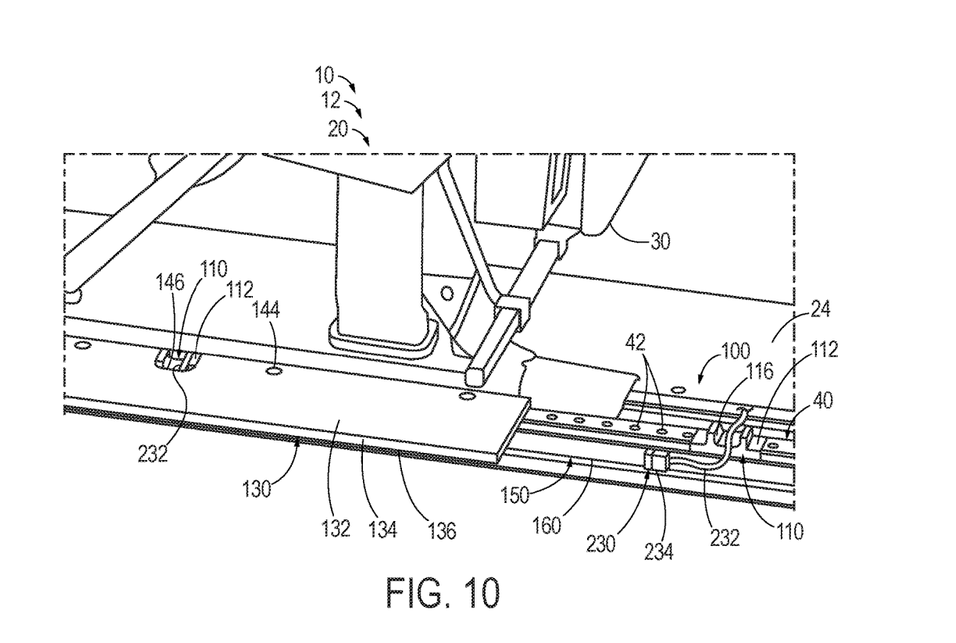
FIG. 10 is a front perspective view representing a modular electrical signal supply assembly positioned in an interior cabin of a vehicle according to the present disclosure.

FIGS. 8-10 illustrate the modular electrical signal supply structure 100 of FIGS. 6-7 positioned within an interior cabin 20 of a vehicle 10. Specifically, FIG. 8 illustrates the modular electrical signal supply structure 100 mounted to the sub-floor support structure 40, which additionally supports a pair of floor panels 130 and a passenger seat 30. FIGS. 9-10 more clearly illustrate the relationship between the modular electrical signal supply structure 100 and the floor panel 130. For example, FIG. 9 illustrates each cord channel 116 being covered by a respective channel cover 118, while FIG. 10 illustrates the modular electrical signal supply structure 100 with the channel covers 118 removed. As best seen in FIG. 10, the floor panel 130 includes a mounting clip cutout 146 that encloses the body portion 112 of a mounting clip 110. As illustrated in FIG. 9, the channel cover 118 is substantially flush with a surrounding region of the upper face sheet 132 of the floor panel 130 when the channel cover 118 is installed on the mounting clip 110. FIGS. 9-10 additionally illustrate a pair of outlet cords 232 electrically coupled to the respective outlet connector interfaces 234 and being received in the respective cord channels 116.

Figure 11:
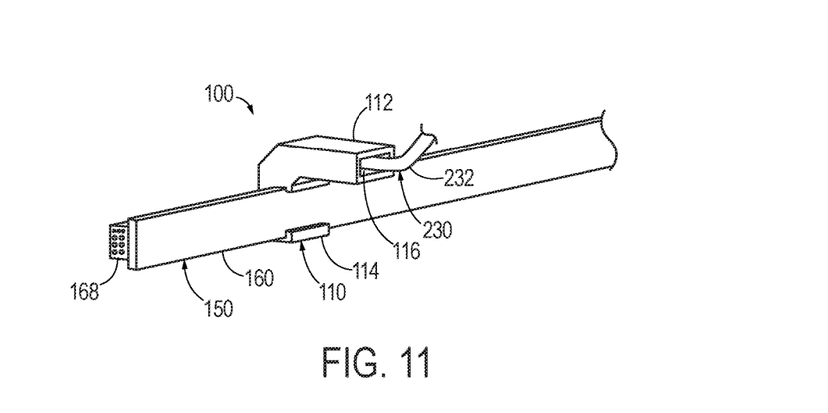
FIG. 11 is a rear perspective view representing a modular electrical signal supply assembly according to the present disclosure.

FIG. 11 illustrates another example of a modular electrical signal supply structure 100 that includes a plurality of outlets 230 (one of which is visible in FIG. 11) in the form of outlet cords 232 that are hard-wired to the PDS 150 as well as a jumper terminal 168. A pair of mounting clips 110 (one of which is visible in FIG. 11) are coupled to the PDS 150. Specifically, and as seen in FIG. 11, the flange portion 114 of the mounting clip 110 partially circumferentially encloses the PDS 150. The mounting clip 110 additionally includes a cord channel 116 that fully circumferentially encloses the outlet cord 232.

Figure 12:
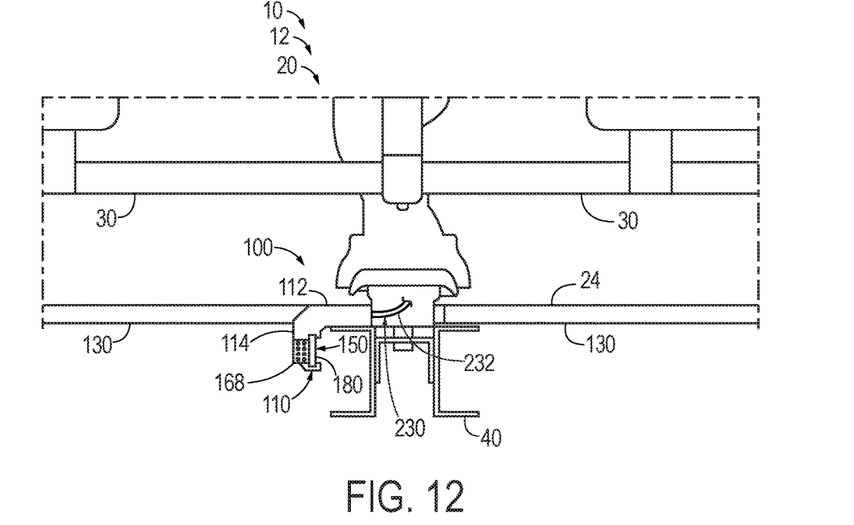
FIG. 12 is a side elevation view representing a modular electrical signal supply assembly positioned in an interior cabin of a vehicle according to the present disclosure.
Figure 13:
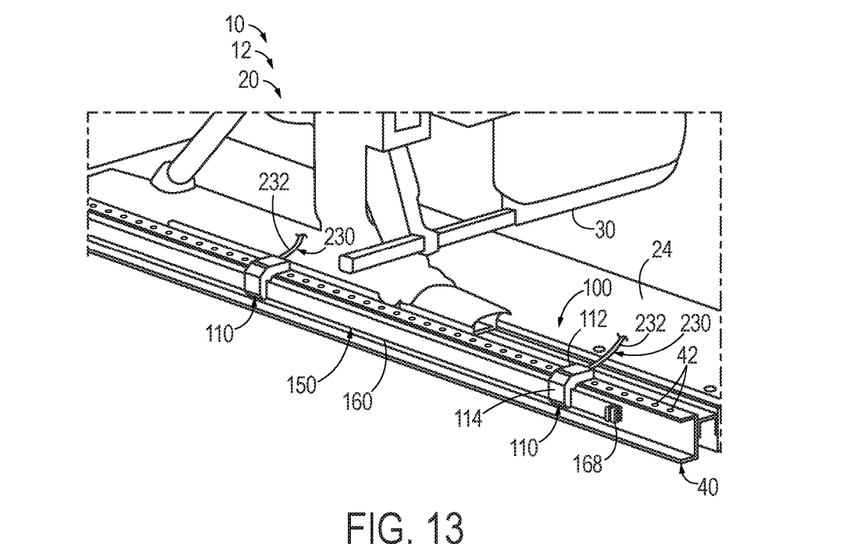
FIG. 13 is a front perspective view representing a modular electrical signal supply assembly positioned in an interior cabin of a vehicle according to the present disclosure.

FIGS. 12-13 illustrate the modular electrical signal supply structure 100 of FIG. 11 positioned within an interior cabin 20 of a vehicle 10. Specifically, FIGS. 12-13 illustrate the modular electrical signal supply structure 100 mounted to the sub-floor surface structure 40, which additionally supports a pair of floor panels 130 (one of which is illustrated in FIG. 13) and a passenger seat 30. As perhaps best illustrated in FIG. 12, the modular electrical signal supply structure 100 is configured such that the outlet cord 232 exits the mounting clip 110 and passes above the plane of the floor surface 24 within the passenger seat 30.

Figure 14:
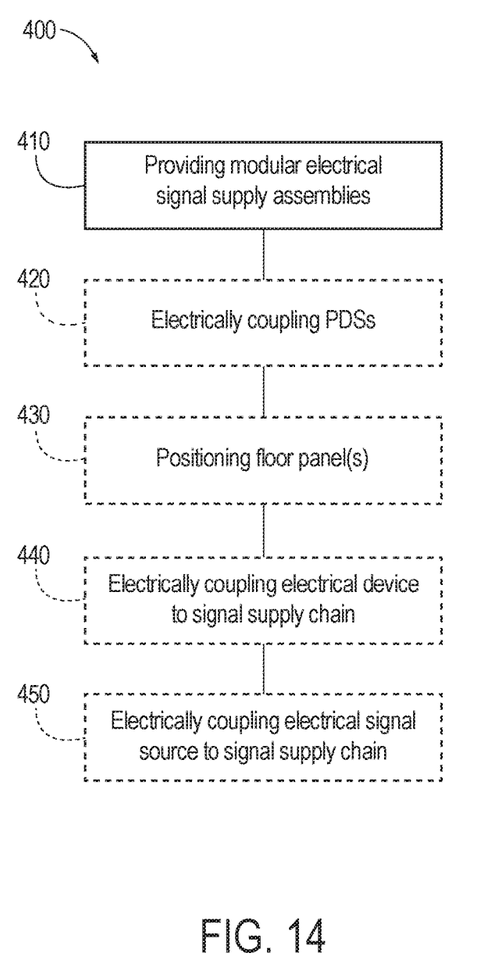
FIG. 14 is a flowchart schematically representing methods of assembling an interior cabin of a vehicle according to the present disclosure.

FIG. 14 schematically provides a flowchart that represents illustrative, non-exclusive examples of methods according to the present disclosure. In FIG. 14, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 14 are not limiting and other methods and steps are within the scope of the present disclosure, including methods having greater than or fewer than the number of steps illustrated, as understood from the discussions herein.

As seen in FIG. 19, a method 400 of assembling an interior cabin of a vehicle (such as the interior cabin 20 of the vehicle 10) includes providing 410 at least two modular electrical signal supply assemblies (such as the modular electrical signal supply assemblies 100), such that each modular electrical signal supply assembly includes a PDS (such as the PDS 150) and a mounting clip (such as the mounting clip 110). The PDS is configured to provide an electrical signal to at least one electrical device (such as the electrical device 220) positioned within the interior cabin. The mounting clip is configured to couple the PDS to a sub-floor surface structure (such as the sub-floor surface structure 40) and to maintain the PDS below a floor panel (such as the floor panel 130) positioned in the interior cabin.

The method 400 further may include electrically coupling 420 each PDS to at least one other PDS to form a signal supply chain (such as the signal supply chain 210) configured to transmit the electrical signal between the PDSs. For example, the electrically coupling 420 may include electrically coupling at least one PDS to at least one other PDS with a jumper (such as the jumper 212).

As further seen in FIG. 9, the method 400 additionally may include positioning 430 at least one floor panel (such as the floor panel 130) at a lower surface of the interior cabin and above at least one PDS to at least partially define a floor surface (such as the floor surface 24).

As still further seen in FIG. 9, the method 400 additionally may include electrically coupling 440 at least one electrical device to the signal supply chain. For example, each modular electrical signal supply assembly may include at least one outlet (such as the outlet 230) configured to electrically couple the PDS to the electrical device, and the outlet may include an outlet connector interface (such as the outlet connector interface 234) configured to be selectively electrically coupled to an input connector interface (such as the input connector interface 224) of the electrical device. In such an embodiment, the electrically coupling 440 may include electrically coupling the outlet connector interface and the input connector interface.

As still further seen in FIG. 9, the vehicle may include an electrical signal source (such as the electrical signal source 240) configured to provide the electrical signal to at least one PDS, and the method 400 further may include electrically coupling 450 the electrical signal source to the signal supply chain, such as via a jumper.

Illustrative, non-exclusive examples of inventive subject matter according to the present disclosure are described in the following enumerated paragraphs:

A. A modular electrical signal supply assembly for an interior cabin of a vehicle, the modular electrical signal supply assembly comprising:

at least one power/data strip (PDS) configured to provide an electrical signal to at least one electrical device positioned within the interior cabin; and at least one mounting clip configured to couple each PDS to a sub-floor surface structure;

wherein each mounting clip is configured to selectively engage a corresponding at least one sub-floor surface structure mounting hole of the sub-floor surface structure, and wherein the mounting clip is configured to maintain the PDS below a floor panel positioned in the interior cabin.

A1.1. The modular electrical signal supply assembly of paragraph A, wherein the mounting clip includes a body portion configured to engage the sub-floor surface structure and a flange portion configured to engage the PDS.

A1.2. The modular electrical signal supply assembly of paragraph A1.1, wherein the body portion and the flange portion are statically coupled to one another in a predetermined orientation.

A1.3. The modular electrical signal supply assembly of any of paragraphs A1.1-A1.2, wherein the body portion is configured to extend at least substantially parallel to the floor panel when the mounting clip engages the sub-floor surface structure and when the floor panel is positioned in the interior cabin.

A1.4. The modular electrical signal supply assembly of any of paragraphs A1.1-A1.3, wherein the flange portion is configured to extend at least substantially perpendicular to the floor panel when the mounting clip engages the sub-floor surface structure and when the floor panel is positioned in the interior cabin.

A2.1. The modular electrical signal supply assembly of any of paragraphs A1.1-A1.4, wherein the flange portion is configured to be selectively and repeatedly coupled to the PDS and uncoupled from the PDS.

A2.2. The modular electrical signal supply assembly of any of paragraphs A1.1-A2.1, wherein the flange portion is coupled to the PDS in a snap-fit coupling.

A2.3. The modular electrical signal supply assembly of any of paragraphs A1.1-A2.2, wherein the flange portion at least partially circumferentially encloses the PDS when the flange portion engages the PDS.

A2.4. The modular electrical signal supply assembly of any of paragraphs A1.1-A2.3, wherein the flange portion is adhered to the PDS by an adhesive.

A2.5. The modular electrical signal supply assembly of any of paragraphs A1.1-A2.4, wherein the flange portion is coupled to the PDS by a mechanical fastener.

A3.1. The modular electrical signal supply assembly of any of paragraphs A1.1-A2.5, wherein the sub-floor surface structure comprises a plurality of sub-floor surface structure mounting holes positioned along a length of the sub-floor surface structure, and wherein the mounting clip comprises at least one surface structure fastener configured to engage a corresponding sub-floor surface structure mounting hole of the plurality of sub-floor surface structure mounting holes to couple the mounting clip to the sub-floor surface structure.

A3.2. The modular electrical signal supply assembly of paragraph A3.1, wherein the at least one surface structure fastener comprises at least two surface structure fasteners.

A3.3. The modular electrical signal supply assembly of any of paragraphs A3.1-A3.2, when dependent from paragraph A1.1, wherein the surface structure fastener comprises a protrusion that extends from the body portion and through a sub-floor surface structure mounting hole to couple the mounting clip to the sub-floor surface structure.

A3.4. The modular electrical signal supply assembly of any of paragraphs A3.1-A3.3, wherein the body portion comprises a fastener aperture, and wherein the surface structure fastener comprises a mechanical fastener configured to extend through the fastener aperture and the corresponding sub-floor surface structure mounting hole to couple the mounting clip to the sub-floor surface structure.

A3.5. The modular electrical signal supply assembly of any of paragraphs A-A3.4, wherein the sub-floor surface structure comprises a seat track configured to retain at least one passenger seat in position within the interior cabin.

A3.6. The modular electrical signal supply assembly of any of paragraphs A3.1-A3.5, wherein the floor panel comprises a plurality of floor panel mounting holes configured to align with a corresponding plurality of sub-floor surface structure mounting holes.

A4.1. The modular electrical signal supply assembly of any of paragraphs A1.1-A3.5, wherein the body portion comprises a cord channel configured to at least partially circumferentially enclose, and optionally fully circumferentially enclose, an outlet cord that electrically couples the PDS to the electrical device.

A4.2. The modular electrical signal supply assembly of paragraph A4.1, wherein the cord channel is configured to partially circumferentially enclose the outlet cord, and wherein the mounting clip further comprises a channel cover configured to be selectively installed on the cord channel to fully circumferentially enclose the outlet cord.

A4.3. The modular electrical signal supply assembly of paragraph A4.1, wherein the cord channel is a shrouded cord channel configured to fully circumferentially enclose the outlet cord.

A4.4. The modular electrical signal supply assembly of any of paragraphs A-A4.3, wherein the floor panel comprises a mounting clip cutout configured to receive at least one of the mounting clip, a/the body portion, a/the cord channel, and a/the channel cover.

A4.5. The modular electrical signal supply assembly of paragraph A4.4, wherein the floor panel comprises at least one of an upper face sheet, a lower face sheet, and a core layer positioned between the upper face sheet and the lower face sheet, and wherein the mounting clip cutout is defined by at least one of the upper face sheet, the core layer, and the lower face sheet.

A4.6. The modular electrical signal supply assembly of any of paragraphs A4.4-A4.5, wherein the mounting clip cutout is configured such that, when the channel cover is selectively installed on the cord channel and when the channel cover is received in the mounting clip cutout, the channel cover is at least substantially flush with an adjacent region of the floor panel.

A5.1. The modular electrical signal supply assembly of any of paragraphs A-A4.6, wherein the electrical signal comprises at least one of an electrical power signal, a data signal, and an electrical ground.

A5.2. The modular electrical signal supply assembly of paragraph A5.1, wherein the electrical signal comprises the electrical power signal, and wherein the electrical power signal has a current that is at least one of at least 100 milliamps (mA), at least 300 mA, at least 500 mA, at least 1 ampere (A), at least 3 A, at least 5 A, at most 10 A, at most 7 A, at most 2 A, at most 1 A, at most 700 mA, and at most 200 mA.

A5.3. The modular electrical signal supply assembly of any of paragraphs A5.1-A5.2, wherein the electrical signal comprises the electrical power signal, and wherein the electrical power signal has a voltage that is at least one of at least 100 millivolts (mV), at least 500 mV, at least 1 volt (V), at least 5 V, at least 10 V, at least 50 V, at least 100 V, at least 500 V, at most 700 V, at most 200 V, at most 70 V, at most 20 V, at most 7 V, at most 2 V, at most 700 mV, and at most 200 mV.

A4.4. The modular electrical signal supply assembly of any of paragraphs A-A4.3, wherein the electrical signal comprises an alternating current.

A5.5. The modular electrical signal supply assembly of any of paragraphs A-A5.4, wherein the electrical signal comprises a direct current.

A5.6. The modular electrical signal supply assembly of any of paragraphs A5.1-A5.5, wherein the electrical signal comprises the data signal, and wherein the data signal has a bandwidth that is at least one of at least 10 kilobits per second (kbps), at least 100 kbps, at least 1 megabit per second (Mbps), at least 10 Mbps, at least 100 Mbps, at least 1 gigabit per second (Gbps), at least 10 Gbps, at most 50 Gbps, at most 5 Gbps, at most 500 Mbps, at most 50 Mbps, at most 5 Mbps, at most 500 kbps, and at most 50 kbps.

A6.1. The modular electrical signal supply assembly of any of paragraphs A-A5.6, wherein the modular electrical signal supply assembly comprises at least one outlet configured to electrically couple the PDS to the electrical device.

A6.2. The modular electrical signal supply assembly of paragraph A6.1, wherein the outlet comprises an outlet connector interface configured to be selectively electrically coupled to an input connector interface of the electrical device.

A6.3. The modular electrical signal supply assembly of paragraph A6.2, wherein the outlet connector interface comprises at least one of a plug, a male plug, a female plug, a receptacle, a coaxial connector, a pin header, a header connector, an edge connector, an Ethernet connector, and a USB connector.

A6.4. The modular electrical signal supply assembly of any of paragraphs A6.2-A6.3, wherein the outlet connector interface is statically fixed to the PDS.

A6.5. The modular electrical signal supply assembly of any of paragraphs A6.1-A6.4, wherein the outlet comprises an outlet cord extending from the PDS.

A6.6. The modular electrical signal supply assembly of paragraph A6.5, wherein the outlet connector interface is positioned on the outlet cord.

A6.7. The modular electrical signal supply assembly of any of paragraphs A6.5-A6.6, wherein the outlet cord is configured to be selectively electrically coupled to the PDS.

A6.8. The modular electrical signal supply assembly of any of paragraphs A6.5-A6.6, wherein the outlet cord is hard-wired to the PDS.

A6.9. The modular electrical signal supply assembly of any of paragraphs A6.1-A6.8, wherein the at least one outlet comprises a plurality of outlets distributed along the PDS and separated by an outlet spacing.

A6.10. The modular electrical signal supply assembly of paragraph A6.9, wherein the outlet spacing is configured to correspond to a seat pitch of a plurality of passenger seats.

A6.11. The modular electrical signal supply assembly of any of paragraphs A6.9-A6.10, wherein the outlet spacing is at least one of at least 20 centimeters (cm), at least 40 cm, at least 60 cm, at least 80 cm, at least 100 cm, at least 120 cm, at most 130 cm, at most 110 cm, at most 90 cm, at most 70 cm, at most 50 cm, at most 30 cm, 30-50 cm, 40-60 cm, 50-70 cm, 60-80 cm, 70-90 cm, 80-100 cm, and 90-110 cm.

A7.1. The modular electrical signal supply assembly of any of paragraphs A-A6.11, wherein the PDS comprises a printed circuit board (PCB), optionally a multi-layered PCB.

A7.2. The modular electrical signal supply assembly of paragraph A7.1, wherein the PCB comprises at least one of a power layer configured to transmit electrical power, a data layer configured to transmit a data signal, and a ground layer configured to provide an electrical ground.

A7.3. The modular electrical signal supply assembly of paragraph A7.2, wherein the PCB comprises the ground layer, and wherein the ground layer is configured to provide electrical shielding to at least one of the power layer and the data layer.

A7.4. The modular electrical signal supply assembly of any of paragraphs A7.2-A7.3, wherein the PCB comprises the power layer and the data layer separated by the ground layer.

A7.5. The modular electrical signal supply assembly of any of paragraphs A7.2-A7.4, wherein the PCB comprises at least one of a plurality of power layers, a plurality of data layers, and a plurality of ground layers.

A7.6. The modular electrical signal supply assembly of any of paragraphs A7.1-A7.5, wherein the PCB is a potted PCB that is at least partially encased in at least one of a resin, a thermosetting plastic, a polymer, polyurethane, silicone, and rubber.

A8.1. The modular electrical signal supply assembly of any of paragraphs A-A7.6, wherein the PDS comprises a jumper terminal configured to transmit the electrical signal to a separate PDS.

A8.2. The modular electrical signal supply assembly of paragraph A8.1, wherein the modular electrical signal supply assembly comprises a jumper configured to be selectively electrically coupled to the jumper terminal.

A8.3. The modular electrical signal supply assembly of paragraph A8.2, wherein the modular electrical signal supply assembly is a first modular electrical signal supply assembly with a first PDS, wherein the jumper terminal is a first jumper terminal, and wherein the jumper is configured to be selectively electrically coupled to each of the first jumper terminal and a second jumper terminal of a second PDS of a second modular electrical signal supply assembly to transmit the electrical signal between the first PDS and the second PDS.

A9.1. The modular electrical signal supply assembly of any of paragraphs A1.1-A8.3, wherein the flange portion is coupled to the PDS by a/the mechanical fastener, wherein the body portion comprises a/the cord channel configured to partially circumferentially enclose a/the outlet cord, and wherein the body portion further comprises two surface structure fasteners in the form of protrusions configured to extend through respective sub-floor surface structure mounting holes to couple the mounting clip to a/the sub-floor surface structure.

A9.2 The modular electrical signal supply assembly of any of paragraphs A1.1-A8.3, wherein the flange portion partially circumferentially encloses the PDS, and wherein the body portion comprises a/the shrouded cord channel configured to fully circumferentially enclose a/the outlet cord.

B. An electrical signal distribution system, comprising:
at least one modular electrical signal supply assembly of any of paragraphs A1-A9.2; and
at least one electrical device electrically coupled to the PDS.

B1.1. The electrical signal distribution system of paragraph B, wherein the at least one modular electrical signal supply assembly comprises a plurality of modular electrical signal supply assemblies with a corresponding plurality of PDSs, and wherein each of the plurality of PDSs are electrically coupled to one another to form a signal supply chain configured to transmit the electrical signal between the plurality of PDSs.

B1.2. The electrical signal distribution system of paragraph B1.1, wherein each of the plurality of PDSs comprises a/the jumper terminal configured to transmit the electric signal to a separate PDS, and wherein the electrical signal distribution system further comprises at least one jumper configured to be selectively electrically coupled to each of at least two separate PDSs to form the signal supply chain.

B1.3. The electrical signal distribution system of any of paragraphs B1.1-B1.2, wherein the plurality of modular electrical signal supply assemblies are positioned such that the plurality of PDSs are at least substantially collinear.

B1.4. The electrical signal distribution system of any of paragraphs B-B1.3, wherein the at least one electrical device comprises a plurality of electrical devices electrically coupled to at least one PDS, optionally a plurality of PDSs, and further optionally a corresponding plurality of PDSs.

B1.5. The electrical signal distribution system of any of paragraphs B-B1.4, wherein the electrical signal distribution system further comprises an electrical signal source configured to provide the electrical signal to at least one PDS of the electrical distribution system.

B1.6. The electrical signal distribution system of any of paragraphs B-B1.5, wherein the electrical signal distribution system further comprises a master control unit in electrical communication with the at least one electrical device and configured to control the electrical signal that is provided to each of the at least one electrical device.

B2.1. The electrical signal distribution system of any of paragraphs B-B1.6, wherein the electrical device comprises at least one of a lighting assembly, a display, a video monitor, a sensor, an electrical power supply, a charging port, a USB charging port, a data port, a USB data port, an Ethernet port, and a wireless communication source.

B2.2. The electrical signal distribution system of any of paragraphs B-B2.1, wherein the electrical device comprises an/the electrical device input configured to form an electrical connection with the PDS.

B2.3. The electrical signal distribution system of paragraph B2.2, wherein the electrical device input comprises an/the input connector interface configured to be selectively electrically coupled to the input connector interface.

B2.4. The electrical signal distribution system of paragraph B2.3, wherein the input connector interface comprises at least one of a plug, a male plug, a female plug, a receptacle, a coaxial connector, a pin header, a header connector, an edge connector, an Ethernet connector, and a USB connector.

B3.1. The use of the electrical signal distribution system of any of paragraphs B-B2.4 on an aircraft.

C. A vehicle, comprising:
an interior cabin; and
the electrical signal distribution system of any of paragraphs B1-B2.4 positioned within the interior cabin.

C1.1. The vehicle of paragraph C, when dependent from paragraph B1.1, wherein the interior cabin comprises a cabin longitudinal axis, and wherein the plurality of PDSs are arranged at least substantially parallel to the cabin longitudinal axis.

C1.2. The vehicle of any of paragraphs C-C1.1, wherein the interior cabin comprises a/the cabin longitudinal axis, and wherein a longitudinal edge of each floor panel is at least substantially parallel to the cabin longitudinal axis.

C1.3. The vehicle of any of paragraphs C-C1.2, wherein the interior cabin comprises a/the cabin longitudinal axis, and wherein each PDS is positioned at least substantially perpendicular to the cabin longitudinal axis.

C1.4. The vehicle of any of paragraphs C-C1.3, wherein the vehicle further comprises at least one passenger seat positioned within the interior cabin, and wherein the electrical device is associated with the at least one passenger seat.

C1.5. The vehicle of paragraph C1.4, when dependent from paragraph A3.5, wherein the interior cabin comprises the seat track, and wherein each of the at least one passenger seat is coupled to the seat track.

C1.6. The vehicle of any of paragraphs C1.4-C1.5, wherein the interior cabin comprises at least one aisle extending at least substantially parallel to a/the cabin longitudinal axis, wherein the aisle is configured to permit a passenger to access the at least one passenger seat.

C1.7. The vehicle of any of paragraphs C-C1.6, wherein each PDS is at least substantially concealed from view.

C1.8. The vehicle of any of paragraphs C-C1.7, wherein the vehicle is an aircraft configured to transport passengers.

C1.9. The vehicle of paragraph C1.8, wherein the aircraft comprises a fuselage that encloses the interior cabin.

C1.10 The use of the vehicle of any of paragraphs C-C1.9 to transport persons.

D. A method of assembling an interior cabin of a vehicle, the method comprising:
providing at least one modular electrical signal supply assembly, each modular electrical signal supply assembly including:
at least one power/data strip (PDS) configured to provide an electrical signal to at least one electrical device positioned within the interior cabin; and
at least one mounting clip configured to couple each PDS to a sub-floor surface structure, wherein the mounting clip is configured to maintain the PDS below a floor panel positioned in the interior cabin; and
electrically coupling each PDS to at least one of an electrical signal source configured to provide the electrical signal to at least one PDS and at least one other PDS to form a signal supply chain configured to transmit the electrical signal to the at least one PDS.

D1.1. The method of paragraph D, wherein the method further comprises positioning at least one floor panel at a lower surface of the interior cabin and above at least one PDS to at least partially define a floor surface.

D1.2. The method of any of paragraphs D-D1.1, wherein the sub-floor surface structure comprises a seat track configured to retain at least one passenger seat in position within the interior cabin.

D1.3. The method of any of paragraphs D-D1.2, wherein the electrically coupling comprises electrically coupling at least one PDS to at least one other PDS with a jumper.

D1.4. The method of any of paragraphs D-D1.3, wherein the method further comprises electrically coupling the at least one electrical device to the signal supply chain.

D1.5. The method of paragraph D1.4, wherein each modular electrical signal supply assembly comprises at least one outlet configured to electrically couple the PDS to the electrical device; wherein the outlet comprises an outlet connector interface configured to be selectively electrically coupled to an input connector interface of the electrical device, and wherein the electrically coupling comprises electrically coupling the outlet connector interface and the input connector interface.

D1.6. The method of any of paragraphs D-D1.5, wherein the vehicle comprises an electrical signal source configured to provide the electrical signal to at least one PDS, and wherein the method further comprises electrically coupling the electrical signal source to the signal supply chain.

D1.7. The method of any of paragraphs D-D1.6, wherein each modular electrical signal supply assembly is the modular electrical signal supply assembly of any of paragraphs A1-A9.2.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A modular electrical signal supply assembly for an interior cabin of a vehicle, the modular electrical signal supply assembly comprising:
   at least one power/data strip (PDS) configured to provide an electrical signal to at least one electrical device positioned within the interior cabin; and
   at least one mounting clip configured to couple each PDS to a sub-floor surface structure;
   wherein the mounting clip is configured to selectively engage a corresponding at least one mounting hole of the sub-floor surface structure; wherein the mounting clip is configured to maintain the PDS below a floor panel positioned in the interior cabin; wherein the mounting clip includes a body portion configured to engage the sub-floor surface structure and a flange portion configured to engage the PDS; and wherein the body portion and the flange portion are statically coupled to one another in a predetermined orientation.

2. The modular electrical signal supply assembly of claim 1, wherein the electrical signal comprises at least one of an electrical power signal, a data signal, and an electrical ground.

3. The modular electrical signal supply assembly of claim 1, wherein the sub-floor surface structure comprises a seat track configured to retain at least one passenger seat in position within the interior cabin.

4. The modular electrical signal supply assembly of claim 1, wherein the sub-floor surface structure comprises a plurality of sub-floor surface structure mounting holes positioned along a length of the sub-floor surface structure, and wherein the mounting clip comprises at least one protrusion that extends from the body portion and through a sub-floor surface structure mounting hole to couple the mounting clip to the sub-floor surface structure.

5. The modular electrical signal supply assembly of claim 1, wherein the modular electrical signal supply assembly comprises at least one outlet configured to electrically couple the PDS to the electrical device.

6. The modular electrical signal supply assembly of claim 5, wherein the outlet comprises an outlet connector interface configured to be selectively electrically coupled to an input connector interface of the electrical device.

7. The modular electrical signal supply assembly of claim 5, wherein the outlet comprises an outlet cord extending from the PDS.

8. The modular electrical signal supply assembly of claim 7, wherein the outlet cord is hard-wired to the PDS.

9. The modular electrical signal supply assembly of claim 7, wherein the body portion comprises a cord channel configured to at least partially circumferentially enclose the outlet cord.

10. The modular electrical signal supply assembly of claim 9, wherein the cord channel is configured to partially circumferentially enclose the outlet cord, and wherein the mounting clip further comprises a channel cover configured to be selectively installed on the cord channel to fully circumferentially enclose the outlet cord.

11. The modular electrical signal supply assembly of claim 9, wherein the cord channel is a shrouded cord channel configured to fully circumferentially enclose the outlet cord.

12. The modular electrical signal supply assembly of claim 5, wherein the at least one outlet consists of a plurality of outlets distributed along the PDS and separated by an outlet spacing.

13. The modular electrical signal supply assembly of claim 12, wherein the outlet spacing is configured to correspond to a seat pitch of a plurality of passenger seats.

14. The modular electrical signal supply assembly of claim 1, wherein the body portion is configured to be received within a mounting clip cutout defined by the floor panel.

15. The modular electrical signal supply assembly of claim 14, wherein the floor panel comprises at least one of an upper face sheet, a lower face sheet, and a core layer positioned between the upper face sheet and the lower face sheet, and wherein the mounting clip cutout is defined by at least one of the upper face sheet, the core layer, and the lower face sheet.

16. The modular electrical signal supply assembly of claim 14, wherein the body portion comprises a cord channel configured to partially circumferentially enclose an outlet cord that extends from the PDS, wherein the mounting clip further comprises a channel cover configured to be selectively installed on the cord channel to fully circumferentially enclose the outlet cord, and wherein the channel cover is configured such that, when the channel cover is selectively installed on the cord channel and when the channel cover is received in the mounting clip cutout, the channel cover is at least substantially flush with an adjacent region of the floor panel.

17. The modular electrical signal supply assembly of claim 1, wherein the PDS comprises a printed circuit board (PCB) that comprises at least one of a power layer configured to transmit electrical power, a data layer configured to transmit a data signal, and a ground layer configured to provide an electrical ground.

18. An electrical signal distribution system, comprising:
  at least one modular electrical signal supply assembly of claim 1; and
  at least one electrical device electrically coupled to the PDS;
  wherein the at least one modular electrical signal supply assembly comprises a plurality of modular electrical signal supply assemblies with a corresponding plurality of PDSs, and wherein each of the plurality of PDSs are electrically coupled to one another to form a signal supply chain configured to transmit the electrical signal between the plurality of PDSs.

19. A vehicle, comprising:
  an interior cabin; and
  an electrical signal distribution system positioned within the interior cabin;
  wherein the interior cabin comprises:
    at least one sub-floor surface structure configured to retain at least one passenger seat in position within the interior cabin; and
    at least one aisle extending at least substantially parallel to a cabin longitudinal axis, wherein the aisle is configured to permit a passenger to access the at least one passenger seat;
  wherein the electrical signal distribution system comprises:
    at least one modular electrical signal supply assembly; and
    at least one electrical device;
  wherein each modular electrical signal supply assembly comprises:
    at least one power/data strip (PDS); and
    at least one mounting clip configured to couple each PDS to a sub-floor surface structure;
    wherein each PDS is configured to provide an electrical signal to at least one of the electrical devices; wherein the mounting clip is configured to selectively engage a corresponding at least one mounting hole of the sub-floor surface structure; and wherein each PDS is selectively electrically coupled to at least one of an electrical signal source configured to provide the electrical signal to at least one PDS and at least one other PDS by a jumper configured to transmit the electrical signal.

20. A method of assembling an interior cabin of a vehicle, the method comprising:
  providing at least one modular electrical signal supply assembly, each modular electrical signal supply assembly comprising:
    at least one power/data strip (PDS) configured to provide an electrical signal to at least one electrical device positioned within the interior cabin; and
    at least one mounting clip configured to couple each PDS to a sub-floor surface structure, and wherein the mounting clip is configured to maintain the PDS below a floor panel positioned in the interior cabin; and
  electrically coupling each PDS to at least one of an electrical signal source configured to provide the electrical signal to at least one PDS and at least one other PDS to form a signal supply chain configured to transmit the electrical signal to the at least one PDS.

* * * * *